(No Model.)

C. TRUMAN.
JOURNAL FOR BICYCLES OR OTHER VEHICLES.

No. 546,719.   Patented Sept. 24, 1895.

Witnesses:
David C. Walter
L. E. Brown

Inventor.
Charles Truman,
By Alison Hall
His Atty.

UNITED STATES PATENT OFFICE.

CHARLES TRUMAN, OF TOLEDO, OHIO.

JOURNAL FOR BICYCLES OR OTHER VEHICLES.

SPECIFICATION forming part of Letters Patent No. 546,719, dated September 24, 1895.

Application filed August 25, 1894. Serial No. 521,297. (No model.)

*To all whom it may concern:*

Be it known that I, CHARLES TRUMAN, a subject of the Queen of Great Britain, residing at Toledo, Lucas county, Ohio, have invented certain new and useful Improvements in Journals for Bicycles or other Vehicles, of which the following is a specification.

My invention relates to ball-bearing journals for bicycles and other vehicles, and its object is to give greater strength and rigidity to the ball-bearing surfaces and to the spindles than have heretofore been found in such journals, and to provide means for the adjustment of the ball-bearing surfaces of such journals, which may be conveniently operated from the outer extremities of the journals instead of at a point inside the bearings of the fork ends, as in vehicles of this class heretofore in use.

I attain these objects by means of the mechanism and arrangement of parts hereinafter described, and shown in the accompanying drawings, made part hereof, in which—

Figure 1:
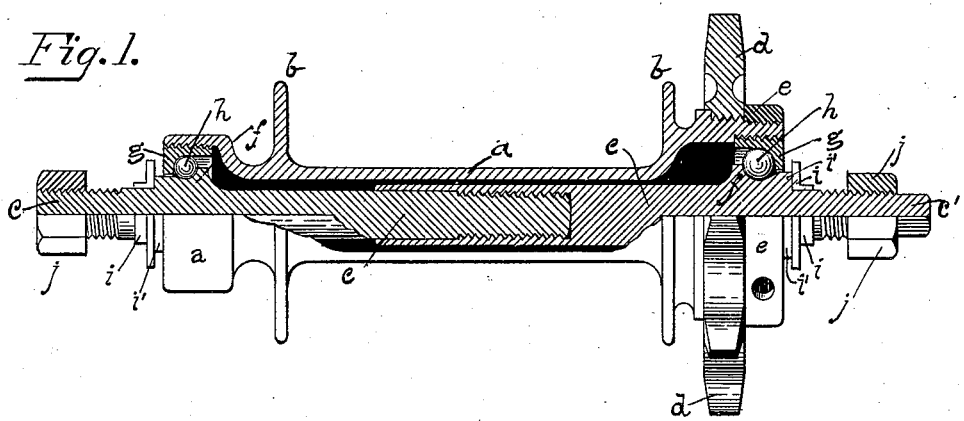
Figure 2:
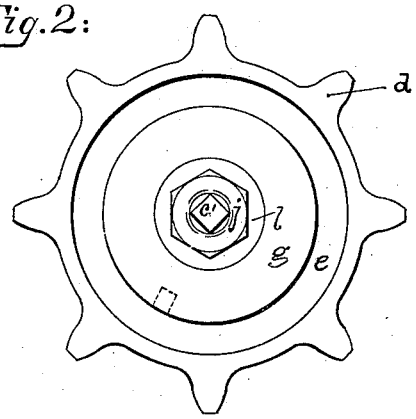

Figure 1 is a side elevation, partly in section, of my journal; Fig. 2, an end view of the same.

Like letters of reference indicate like parts throughout both views.

In the drawings, $a$ is the cylindrical hub, having the usual flanges $b$, from which radiate the suspension-spokes. (Not shown in the drawings.)

$c$ is a spindle passing through the center of the hub, made in two parts, the inner end of one part being interiorly threaded, and the inner end of the other part being exteriorly threaded so that the two parts may be screwed together within the hub, as shown in Fig. 1.

$d$ is the sprocket-wheel or chain-wheel, screwed upon the hub; $e$, a lock-nut or keeper for the sprocket-wheel, screwed upon the hub by means of a left-hand thread.

$f f$ are ball-bearing cones formed integral with the spindle $c$.

$g g$ are cup-shaped nuts having a conical cavity, screwed into the ends of the hub, forming, in conjunction with the cone on the spindle, a ball-bearing race for the antifriction-balls $h$.

$i i$ are washers resting against shoulders $i'$ $i'$ upon the spindle, and $j j$ are nuts on the projecting screw-threaded ends of the spindle. The spaces between the washers $i$ and nuts $j$ are designed to receive and support the fork ends of the bicycle-frame, (not shown in the drawings,) the nuts $j$ being set up firmly against the fork ends, securing them rigidly to and preventing rotation of the spindle. Assuming that the parts are assembled, adjustment of the ball-bearing surfaces of the cone $f$ and screw-threaded cups $g$ is obtained as follows: The nut $j$ on the projecting end of the spindle $c$ is slightly loosened, a wrench is applied to the square projecting end $c'$ of the spindle, and a slight turn of the wrench to the right or left lengthens or shortens the spindle, the two screw-threaded halves being thereby projected or retracted, carrying the ball-bearing surfaces of the cones upon the spindles toward or away from the corresponding surfaces of the ball-bearing cups $h$. The exact desired adjustment and relation of the two ball-bearing surfaces having been thus obtained, nut $j$ is now tightly set up against the fork end and the operation is complete. It will be observed that the pinch of the fork end between the washer $i$ and set-nut $j$ is obtained without in the least affecting the adjustment of the ball-bearing surfaces and that the wrench has been readily and conveniently applied outside of the wheel instead of between the fork ends and the hub, as heretofore. The adjustment may be had at either end of the spindle, it being understood that it is only necessary to give one end of the spindle an outer extremity square headed or otherwise suitably prepared to receive a wrench or key.

The advantages of my device, in which both ball-bearing cones are formed integral with the spindle, are that such spindle is stronger and the cones are solid and rigid and maintain their adjustment more constantly than where the cones are movable upon the spindle.

An additional advantage of my device is that the adjustment of the ball-bearing surfaces is entirely independent of the side thrust of the fork ends and their adjusting-nuts, thereby relieving the ball-bearings from any undue strain on that account.

Having described my invention and its mode of operation, what I claim, and desire to secure by Letters Patent, is—

1. In a journal for bicycles, in combination with the hub, a spindle in two parts, a ball-bearing cone on each of said two parts formed integral therewith, and a male and female screw at the meeting ends of said two parts of said spindle whereby said ball-bearing cones may be adjusted in relation to each other, substantially as and for the purpose specified.

2. In a journal for bicycles, in combination with the hub, a spindle in two parts, a ball-bearing cone on each of said two parts formed integral therewith, and a male and female screw at the meeting ends of said two parts of said spindle whereby said ball-bearing cones may be adjusted in relation to each other, and a square head or equivalent device at the outer extremity of said spindle adapted to receive a wrench or key whereby the adjustment of the ball-bearing cones may be effected from outside the fork-ends of the wheel, substantially as shown and described, for the purpose specified.

3. In a journal for bicycles, in combination with the hub, a spindle in two parts, a ball-bearing cone on each of the two parts formed integral therewith, a male and female screw at the meeting ends of said two parts of said spindle, a shoulder ($i'$) upon each of said two parts of said spindle, washers ($i\ i$) resting against said shoulders and nuts ($j\ j$), on the projecting screw-threaded ends of said spindle, all substantially as and for the purpose specified.

4. A journal for bicycles or other vehicles, comprising a hub, a sprocket-wheel screwed thereon, a ball-bearing cup screwed therein, in combination with a two-part spindle passing therethrough, and adjustably screwed together at their meeting ends, ball-bearing cones on each of said two parts of said spindle formed integral therewith, anti-friction balls in the ball-race formed by said screw-cups and said cones, a shoulder and washer ($i\ i'$), on each of the two parts of said spindle, nuts on the outer extremities of said spindle adapted to engage the fork-ends of the bicycle frame, and a square head or equivalent device at the outer extremity of one of said spindle parts, all substantially as and for the purpose specified.

CHARLES TRUMAN.

Witnesses:
J. B. COGANS,
L. E. BROWN.